United States Patent [19]

Applequist et al.

[11] Patent Number: 4,664,202
[45] Date of Patent: May 12, 1987

[54] FOLDING IMPLEMENT FRAME FOR GRAIN DRILLS AND THE LIKE

[75] Inventors: Roy E. Applequist, Salina; Eric Johnson, Assaria; Ray A. Adee, Newton, all of Kans.

[73] Assignee: Great Plains Manufacturing, Inc., Assaria, Kans.

[21] Appl. No.: 648,761

[22] Filed: Sep. 7, 1984

[51] Int. Cl.$^4$ .................... A01B 49/04; A01B 73/06; A01C 5/06
[52] U.S. Cl. .................... 172/311; 172/456; 172/459; 172/624.5; 111/57
[58] Field of Search .................... 172/310–311, 172/331, 443, 446, 456–459, 502, 624, 624.5, 631, 652, 657, 662, 776, 445.1, 449, 450; 111/57; 280/411 A, 411 R, 413

[56] References Cited

U.S. PATENT DOCUMENTS

| | | | |
|---|---|---|---|
| 2,691,931 | 10/1954 | Wilson | 172/439 X |
| 3,014,539 | 12/1961 | Ward | 172/450 X |
| 3,493,246 | 2/1970 | Tasset et al. | 172/456 X |
| 3,493,247 | 2/1970 | Tasset et al. | 280/411 A |
| 3,505,704 | 4/1970 | Hornung et al. | 172/311 X |
| 3,521,905 | 7/1970 | Tasset et al. | 280/411 R |
| 4,171,022 | 10/1979 | Applequist | 172/456 X |
| 4,172,537 | 10/1979 | Gandrud et al. | 172/311 X |
| 4,206,815 | 6/1980 | Hatcher | 172/456 X |
| 4,211,288 | 7/1980 | Applequist | 172/328 |
| 4,214,637 | 7/1980 | Applequist | 172/484 |
| 4,272,097 | 6/1981 | Cornelius | 172/311 X |
| 4,299,292 | 11/1981 | Hughes | 172/311 |
| 4,338,872 | 7/1982 | Decker | 111/56 |
| 4,360,067 | 11/1982 | Schaaf et al. | 172/413 |
| 4,360,215 | 11/1982 | Nohl et al. | 280/413 |
| 4,364,581 | 12/1982 | Shoup | 172/311 X |
| 4,518,046 | 5/1985 | Rettig et al. | 172/311 |
| 4,529,040 | 7/1985 | Grollimund | 172/311 |

FOREIGN PATENT DOCUMENTS 2220162 10/1973 Fed. Rep. of Germany ...... 172/311
2483731 12/1981 France .................... 172/311

Primary Examiner—Richard J. Johnson
Assistant Examiner—Terrence L. B. Brown
Attorney, Agent, or Firm—Schmidt, Johnson, Hovey & Williams

[57] ABSTRACT

A pull-type folding implement, such as a grain drill, has individual and independent radial flotation for each of its drill units such that each unit can rise and fall, while remaining level, independently of the other, as well as cock and cant independently of the other as may be necessary to accommodate uneven ground terrain, yet the units may be folded into compact, fore-and-aft extending transport positions in which ground wheels thereof are retracted off the ground and the units are carried by a main, fore-and-aft carrier frame of the implement. A third, center unit may be provided between the two outer units and utilizes its own set of ground wheels during both field working and over-the-road travel when the other units are folded in, the center unit likewise having a floating connection with the carrier frame which permits the center unit to rise and fall, cock and cant when experiencing terrain irregularities. Because the weight of the two outer units is borne entirely by the carrier frame when the outer units are folded in for transport, a safety interlock is provided which prevents unfolding of the outer units from the carrier frame unless the ground wheels of the outer units have first been lowered into ground engaging positions capable of supporting the load of the outer units. Special cocked pivot assemblies coupling the outer units with the central carrier frame cause the units to be likewise cocked about their longitudinal axes when folded into the transport position such that depending, outboard extremities of the units are provided with an extra measure of ground clearance at that time.

18 Claims, 11 Drawing Figures

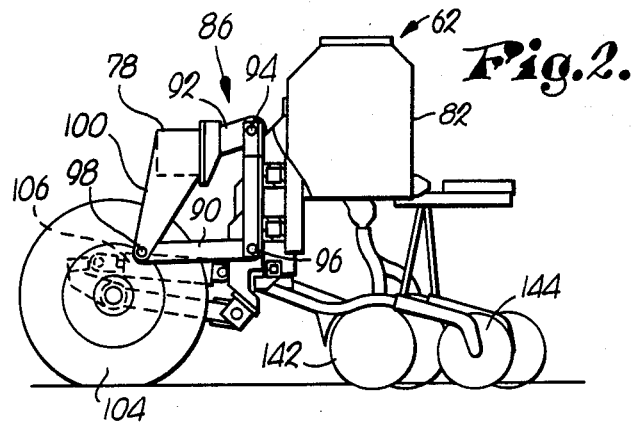
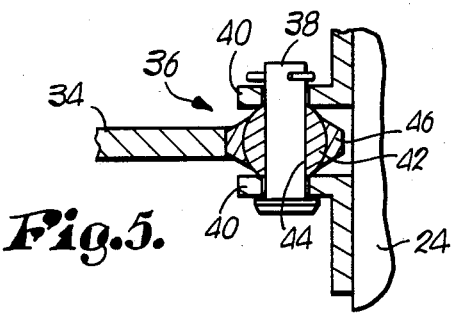
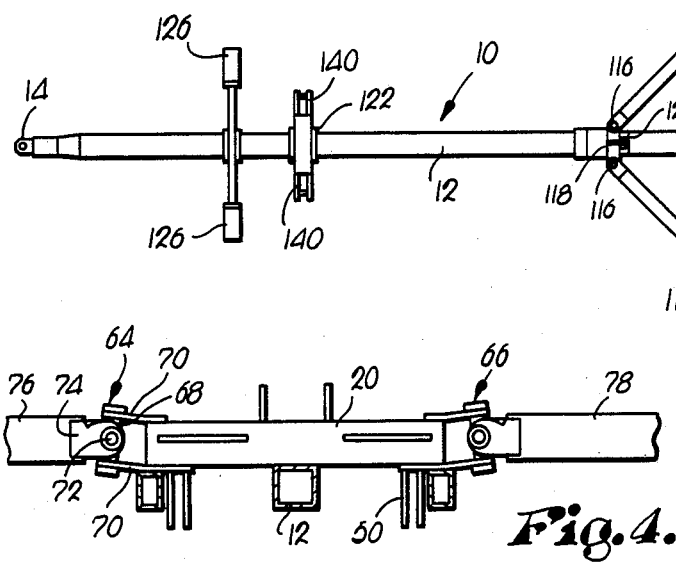
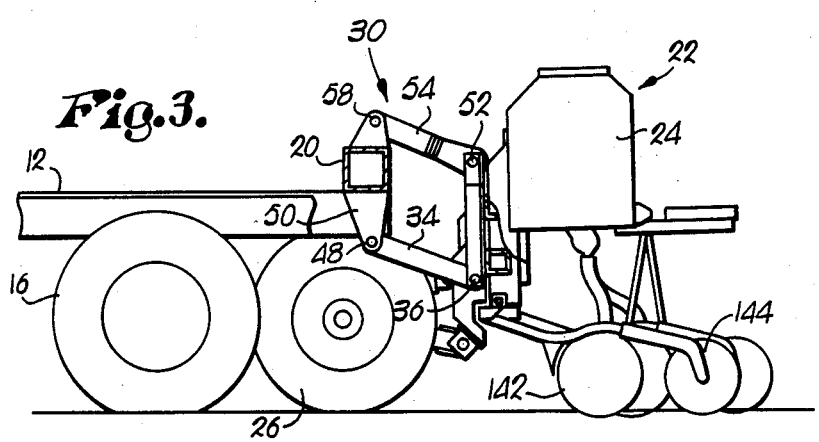
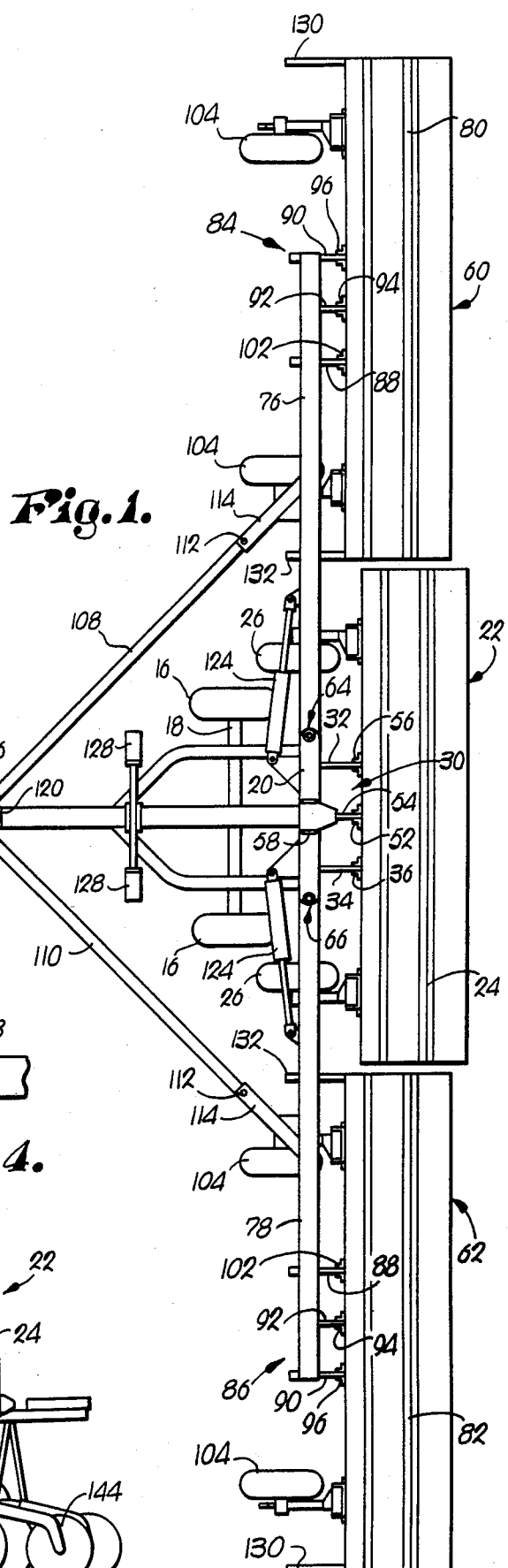

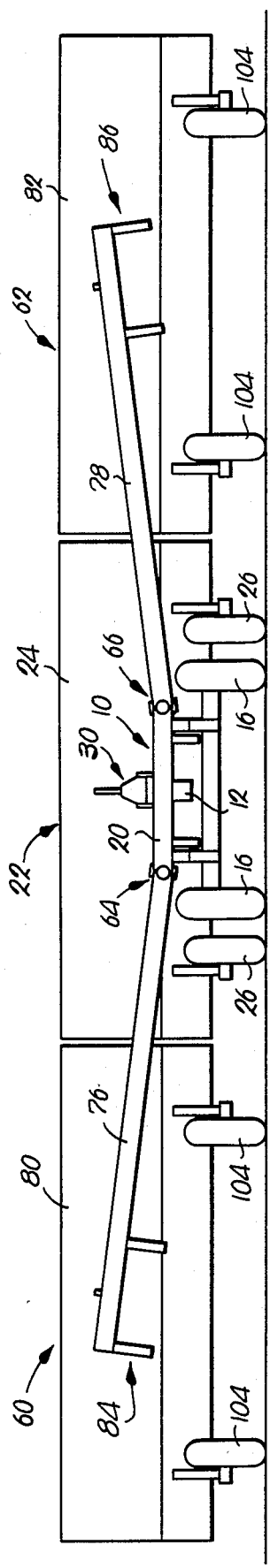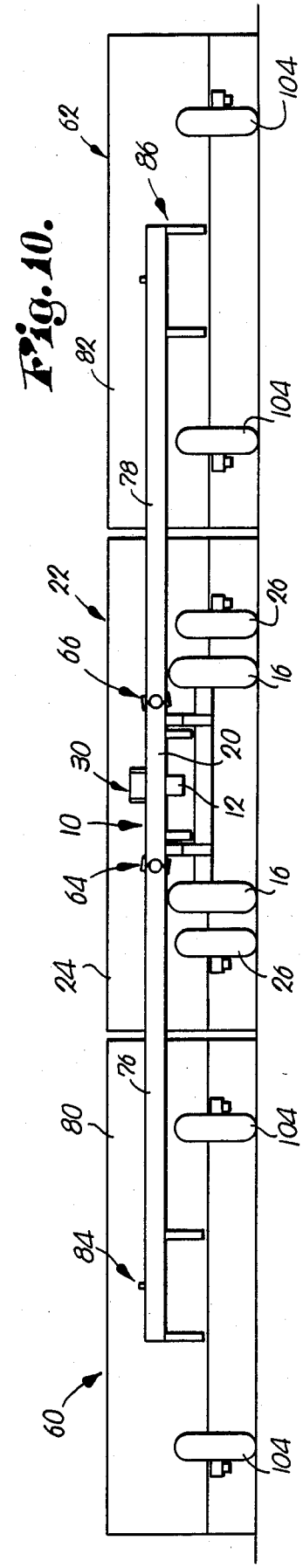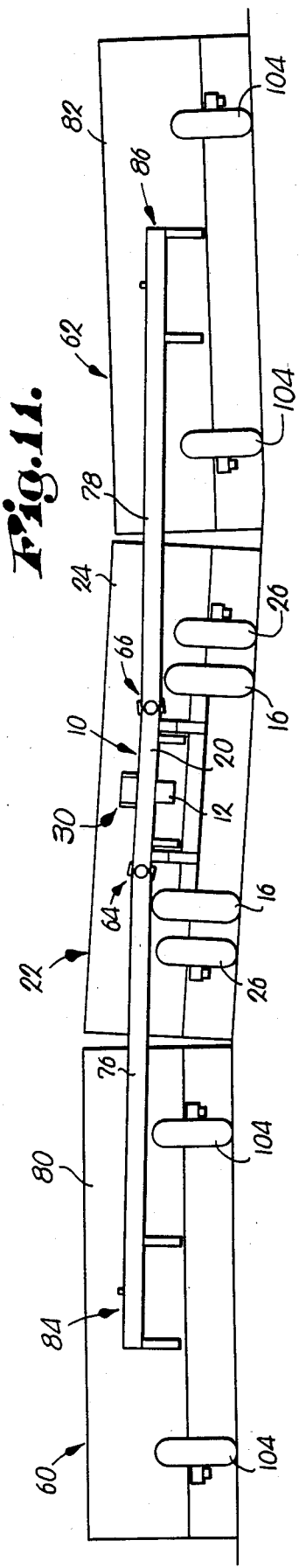

FOLDING IMPLEMENT FRAME FOR GRAIN DRILLS AND THE LIKE

TECHNICAL FIELD

This invention relates to the field of folding agricultural implements and has particular utility in connection with grain drills and like planting equipment wherein it is desirable to precisely maintain uniform planting depth in spite of changes in ground contour across the expansive width of the machine, yet at the same time provide the capability of folding the machine into a sufficiently compacted condition as to facilitate roading thereof.

BACKGROUND

In drilling operations in particular, such as when planting wheat and soybeans, it is especially desirable to precisely maintain a selected optimum planting depth in order to promote proper plant emergence and subsequent growth. While on relatively narrow drill units this is not a particular problem, since they can be rather easily attached to a three-point mounted tool bar or the like in a suitably flexible manner, the situation is not so easily dealt with where the machines are significantly wider than the pulling tractor in order to cover substantially more ground during each pass. There, in addition to providing flexibility for the various drill units of the machine, it is also necessary to contend with the width problem during over-the-road transport, and, accordingly, some provision must be made for folding the machines from widespread field working positions into more compacted, transport positions suitable for over-the-road travel. Heretofore, in order to provide acceptable folding, there has been a trade off of sorts with respect to flexing capabilities of the units which make up the machine, that is, the "outrigger" or "wing" units of the machine have typically been connected to a main frame or central frame section of the machine in ways that permit the outriggers to swing up and down like flapping wings when terrain irregularities are encountered but not rise or fall bodily realtive to the main frame or twist and cant in what may be termed "radial flotation".

SUMMARY OF THE PRESENT INVENTION

Accordingly, an important object of the present invention is to provide a construction for large, wide, multiple-section machines such as grain drills which, while permitting the sections to be folded efficiently and compactly for over-the-road transport, enables the several ground-working drill units for the machine to flex so independently of one another during field operation and to follow their individually encountered ground countors so well that the units perform as if they were totally separate, disconnected, individual drill units.

Pursuant to the foregoing, the present invention contemplates providing a single, centrally disposed main carrier frame to which a pair of tool beams are pivoted at the rear end thereof for extension laterally outwardly therefrom in opposite directions during field working. The tool beams are free to float up and down about their pivots with the main frame, as well as swing fore-and-aft between the field working position and a transport position in which they are located alongside of and supported by the carrier frame. At least two tool units such as grain drills are coupled with the beams along the rear edges thereof in such a manner that each of the units can oscillate, twist or cant about a fore-and-aft axis inboard of opposite ends of the unit so as to provide radial flotation, and although the swivel which provides radial flotation for each of the units is fixed against up-and-down movement relative to its cooresponding tool beam, the pivotal coupling of the beam with the main carrier frame is such as to permit the beam itself to simply be carried upwardly and downwardly about such pivot in a free-floating action with its unit when such unit rises or falls due to an encountered terrain irregularity. While ground wheels associated with each of the units support the same during field operations, when the units and their associated tool beams are swung forwardly into folded-in transport positions alongside of the carrier frame, the ground wheels of the units may be retracted off the ground and the units with their respective beams carried totally by the carrier frame. At this time, a safety interlock is engaged to prevent unfolding of the beams and units unless the ground wheels thereof have first been lowered into either ground contacting positions or positions closely adjacent the ground.

The pivot assemblies for the beams are cocked in such a manner as to cause the beams to be rotated slightly about their respective longitudinally axes when swung from the working position to the transport position thereof so as to raise outboard, depending portions of the drill units by an extra amount in order to provide additional ground clearance therefor. Preferably, a central tool unit is provided between the outrigger units which is attached directly to the rear of the carrier frame but is totally independent from the two outrigger units. Independent radial flotation is provided for the center unit via a three-point support linkage between such unit and the carrier frame, but ground wheels associated with such center unit remain ground-engaging at all times during both field operations and over-the-road travel such that the weight of the center unit is borne solely by its ground wheels and not by the carrier frame.

BRIEF DESCRIPTION OF THE DRAWINGS

FIG. 1 is a top plan view of an implement constructed in accordance with the principles of the present invention, such implement being illustrated as being in the nature of a three-section grain drill;

FIG. 2 is an end elevational view of one of the outrigger sections thereof with parts broken away to reveal details of construction;

FIG. 3 is a fragmentary end elevational view of the center section of the implement with parts broken away for clarity;

FIG. 4 is a slightly enlarged fragmentary, vertical cross-sectional view through the machine looking toward the rear thereof from a location just forward of the pivot assemblies for the outrigger sections;

FIG. 5 is an enlarged, fragmentary detail view illustrating the nature of the various swivel connections associated with the couplings between the drill units and their associated framework portions;

FIGS. 9, 10, and 11 are schematic front elevational views of the machine illustrating the independent, radial floating capabilities of the multiple sections thereof.

DETAILED DESCRIPTION

Figure 6:
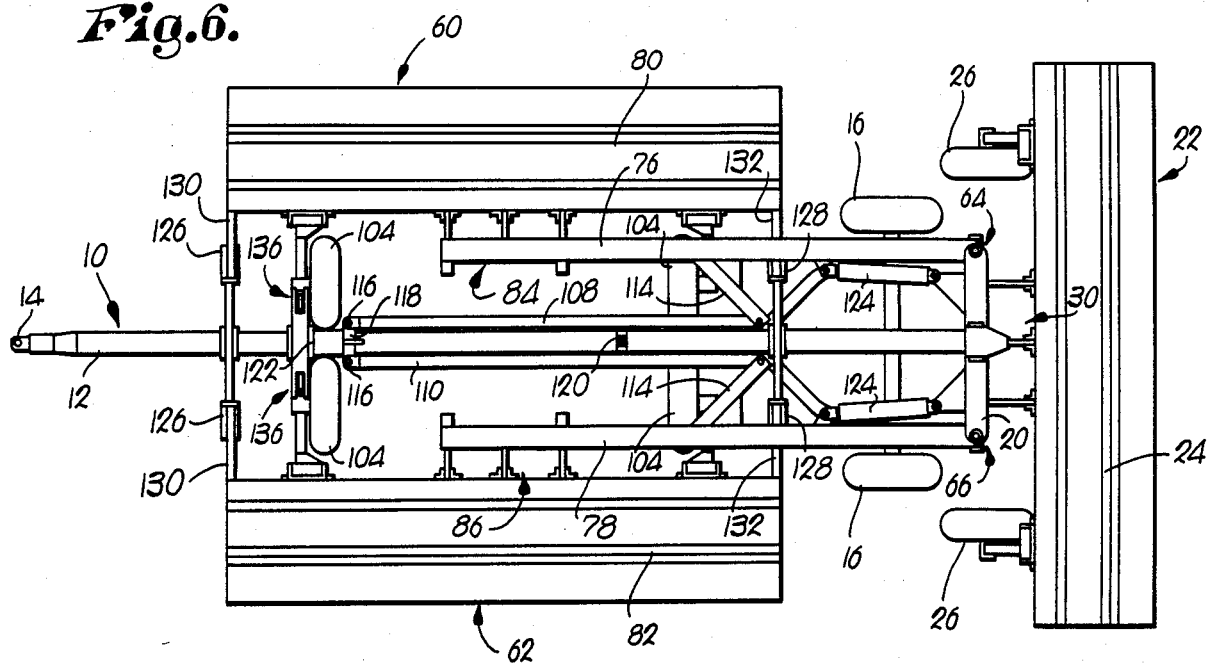
FIG. 6 is a top plan view of the machine showing the outrigger sections thereof folded-in to their transport position for over-the-road travel.

The illustrated machine has a central, main carrier frame 10 having a fore-and-aft extending, long beam 12 provided with a hitch 14 at the forward end thereof for coupling the machine to a towing vehicle (not shown). A set of ground wheels 16 adjacent the rear of the beam 12 are maintained in a fixed vertical disposition relative to the beam 12 by an axle 18 passing beneath the latter. Thus, during both over-the-road travel and field operations, the carrier frame 10 remains at the same height.

A relatively short cross beam 20 is provided at the rear of the central beam 12 to render the carrier frame generally T-shaped when viewed in plan, with the head of the T at the rear. A center drill section broadly denoted by the numeral 22 is pivotally coupled to the cross beam 20 so as to be disposed on the rear side thereof with its longitudinal axis as viewed in plan extending at least generally parallel with the axis of the cross beam 20. Center section 22 includes a drill unit 24, the details of construction of which need not be set forth here, except to point out that such unit 24 is provided with a pair of ground wheels 26 spaced apart on opposite sides of the center beam 12 for supporting the unit 24 during both field working and over-the-road travel. As is well understandable by those skilled in the art, each of the ground wheels 26 may be pivotally retracted relative to its unit 24 via suitably coupled hydraulic piston and cylinder assemblies 28 so that both the operating depth of the unit 24 and its height during over-the-road travel may be determined by the extent of retraction or extension of the cylinder assemblies 28.

The center section 22 further includes a three-point linkage broadly denoted by the numeral 30 which directly couples the drill unit 24 to the carrier frame 10 at the cross beam 20 thereof. Such linkage 30 includes a pair of lower links 32 and 34 secured to the drill unit 24 at longitudinally spaced locations along the latter and adjacent the lower, forward extremities thereof. The connections at opposite ends of the links 32 and 34 with the drill unit 24 and the cross beam 20 respectively are in the nature of swivel connections, such as illustrated in FIG. 5 with respect to the link 34. It is to be appreciated in this respect that all of the various swivel connections hereinafter described are in the nature of that illustrated in FIG. 5 and that while only a single such connection has been illustrated, such is for the sake of expediency only inasmuch as one skilled in the art, upon noting the connection as illustrated in FIG. 5, can readily understand therefrom the nature of the other various swivel connections associated with the machine.

With this in mind, suffice it to point out that the swivel connection illustrated in FIG. 5, denoted by the numeral 36, generally includes a transverse pivot pin 38 extending between and retained by a pair of spaced ears 40 on the drill unit 24, a ball 42 received on the pin 38 via a central bore 44 through the ball 42, and a ring 46 circumscribing the ball 42 and slidingly retained thereon for swiveling movement in an infinite number of directions about the periphery of the ball 42, the ring 46 being fixedly secured to the arm 34 such as to render the latter likewise movable in an infinite number of directions. Those swivel connections associated with the center section 22, and corresponding either identically or in closely similar manner to the connection 36, include a connection 48 between the forward end of the lower link 34 and a depending lug 50 from the cross beam 20, a connection 52 between the rear end of an upper stabilizer link 54 of the linkage 30 located between and above links 32, 34, a connection 56 between the rear end of the lower link 32 and the drill unit 24, and a connection (not shown) between the forward end of the link 32 and the cross beam 20. The connection 58 between the front end of the upper link 52 and a pair of upstanding lugs on the cross beam 20 is not a universal-type swivel connection, but instead provides only for swinging of the upper link 54 about a transverse horizontal axis extending parallel to the cross beam 20.

The machine also includes a pair of outrigger sections 60 and 62 which are coupled with the carrier frame 10 on opposite sides of the latter via pivot assemblies 64 and 66 located at opposite ends of the cross beam 20. As perhaps illustrated best in FIGS. 4 and 7, each of the pivot assemblies 64, 66 is in the nature of a universal joint and includes a generally upright pivot member 68 journalled between a pair of upper and lower ears 70, as well as a generally horizontal pivot member 72 which intersects the axis of rotation of the pivot member 68 and is rotatable relative thereto. Preferably, the ears 70 are bent upwardly out of a purely horizontal condition on the order of seven to ten degrees, for example, so as to cock the upright pivot out of a truly vertical orientation into a corresponding seven to ten degree tilt from vertical inwardly toward the central axis of the machine as illustrated best in FIG. 4. The pivot member 72 remains perpendicular to the pivot member 68 and, thus, while extending horizontally when positioned with its axis of rotation leading in a fore-and-aft direction, becomes cocked at a seven to ten degree angle when rotated ninety degrees into a position in which its axis of rotation extends transversely of the path of travel of the machine.

The two "horizontal" pivots 72 are each fixedly joined via mounting ears 74 to the inner ends of a pair of tool beams 76 and 78 of the sections 60, 62 so as to adapt such beams 76, 78 for both fore-and-aft and up-and-down swinging movement. In addition to the beams 76, 78, the outrigger sections 60, 62 also include drill units 80 and 82 respectively which are virtually identical in construction to the center drill unit 24 of center section 22, although the units 80 and 82 are coupled with their respective beams 76, 78 in a slightly different manner than the center unit 24 is coupled with cross beam 20. In this respect, while the two outer units 80 and 82 are coupled with their respective beams 76, 78 through what may be termed three-point linkages 84 and 86, each having a pair of lower links 88 and 90 swivel-connected between the unit and the beam in the same way as the link 34 of center unit 24, the upper link 92 of each linkage 84, 86 is a rigid, non-swinging link in constrast to the upper swinging link 54 of linkage 30.

For example, as shown in FIG. 2 with respect to the linkage 86, the upper link 92 thereof is rigidly affixed at its front end to the beam 78 and projects upwardly and rearwardly therefrom at a fixed angle. At its rear end, the upper link 92 has a swivel connection 94 with the unit 82 of the same character and quality as the swivel connection 36 illustrated in FIG. 5. Likewise, the lower link 90 illustrated in FIG. 2 has a swivel connection 96 at its rear end with the unit 82 and a similar swivel connection 98 at its front end with a depending lug 100 on the beam 78. It is to be understood that the other lower link 88 of linkage 86 has a rear swivel connection 102 with the unit 82 (shown only in the plan views of FIGS. 1 and 6), as well as another swivel connection (not shown) at its forward end with the beam 78 through a depending lug of the same nature as the lug 100. The linkages 84 and 86 are identical insofar as their swivel connections are connected and the rigid, non-pivoting nature of their upper links 92. It will be noted, of course, that the units 80, 82 are attached to the rear sides of the beams 76, 78 and extend with their longitudinal axes parallel to such beams 76, 78 as viewed in plan. It will be further noted that the linkages 84 and 86 couple the units 80 and 82 with the beams 76, 78 adjacent the outer ends of the latter so as to leave a vacant inner stretch of the beams 76, 78 which is occupied by the center unit 24 when the beams 76, 78 are in their widespread, field working positions as illustrated in FIG. 1, for example. At that time, the units 24, 80, and 82 become disposed in essentially end-to-end relationship.

Each of the units 80, 82 is also provided with a pair of substantially identical ground wheels 104 adjacent opposite ends thereof and projecting forwardly therefrom below the corresponding beam 76 or 78. Each of the wheels 104 is rendered retractable and extendable relative to its unit 80 or 82 by a hydraulic piston and cylinder assembly 106 (as will be well understood by those skilled in the art), and it will be appreciated that, as the cylinders 106 are extended and retracted, the units 80 and 82 are raised and lowered, carrying with them the beams 76, 78 which swing freely up and down about their respective pivots 64, 66.

In order to retain the sections 60, 62 in their working positions as the machine is advanced through the field, the beams 76, 78 are provided with tension links 108 and 110 on opposite sides of the carrier frame 10 which effectively connect the central beam 12 of the latter with the beam 76, 78 at such time and prevent further rearward swinging movement of the beam 76, 78 beyond their illustrated, working positions. At their rear ends, each of the tension links 108, 110 has a pivot connection 112 with the front end of a forwardly and inwardly projecting arm 114 that is rigidly affixed at its rear end to the corresponding beam 76 or 78. At its forward end, each of the tension links 108, 110 has a second pivot connection 116 with a collar 118 slidably received on the central beam 12 for fore-and-aft movement along the latter between a rear stop 120 and a forward stop 122. Suitable locking means (not shown) may be utilized for releasably locking the collar 118 in either of its two positions abutting the stops 120 and 122 such as, for example, a removable kingpin which is inserted through mating, aligned holes in proximal portions of the ring 118 and the stops 120, 122.

In order to effect powered swinging of the outrigger sections 60, 62 between their working position of FIG. 1 and a transport position as shown in FIG. 6, and working positions, a pair of swing cylinders 124 of hydraulic piston and cylinder construction are provided. Each of the cylinders 124 is operably connected between the cross beam 20 on the one hand and the corresponding tool beam 76 or 78 on the other hand in the manner illustrated for effecting such powered movement.

Figure 7:
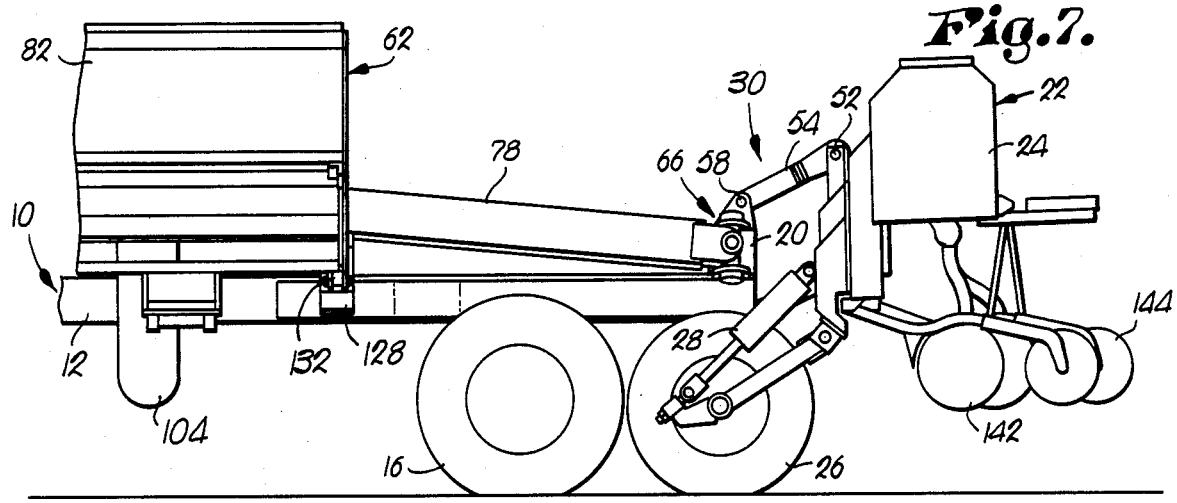
FIG. 7 is a fragmentary side elevational view thereof with the outrigger sections in their transport position.
Figure 8:
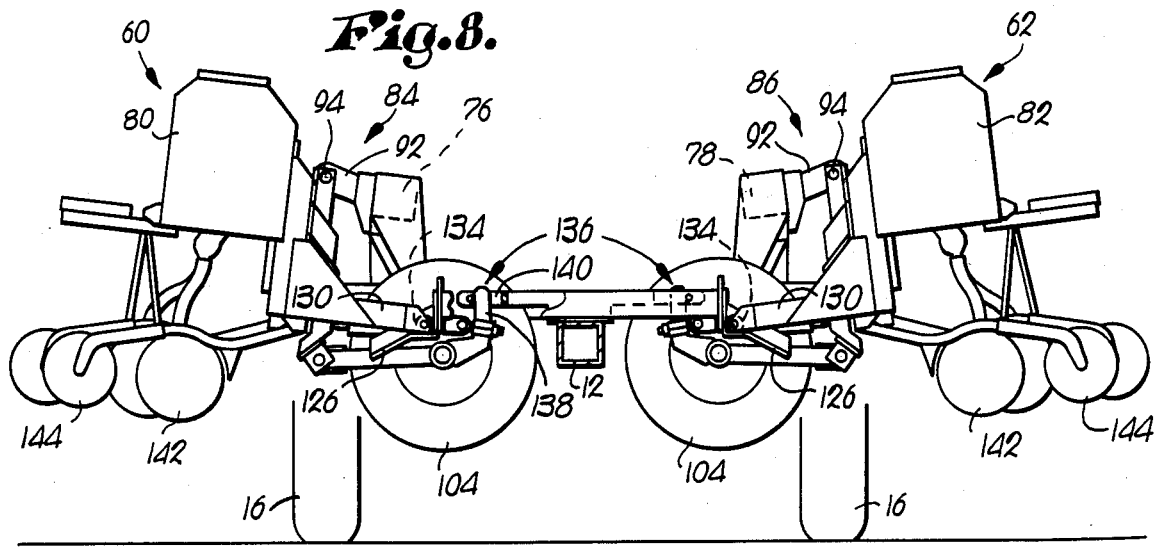
FIG. 8 is essentially a front end elevational view of the machine with the outrigger sections folded in looking to the rear and with portions of the machine removed for clarity.

While the outrigger sections 60, 62 are fully supported by the ground wheels 104 thereof during field working, such sections are supported entirely by the carrier frame 10 when the sections 60, 62 are disposed in their transport position for over-the-road travel as illustrated in FIGS. 6, 7, and 8. To this end, each side of the carrier frame 10 is provided with a pair of fore-and-aft spaced, laterally outwardly projecting support ledges 126 and 128 that are rigidly affixed to the central beam 12 and extend therefrom in cantilever fashion. As illustrated best in FIG. 8, each of the ledges 126, 128 has a down-turned outermost extremity formed to rpesent a guiding entry ramp to the more elevated, inner horizontal portion of the ledge 126, 128. Cooperating, laterally outwardly projecting protrusions or support bars 130 and 132 are provided at opposite ends of each of the units 80, 82 at such a level as to be received by the corresponding ledges 126, 128 when the outer sections 60, 62 are swung forwardly into their transport positions. Anti-friction rollers 134 on the outermost ends of the bars 130, 132 assist in guiding the latter up the ramps and onto the horizontal portions of the ledges 126, 128 as the folding of sections 60, 62 into their transport position is completed.

A safety interlock broadly denoted by the numeral 136 is provided adjacent the outer ends of the sections 60, 62 and the forward end of the carrier frame 10 for preventing unfolding of the sections 60, 62 out of their transport position unless the ground wheels 104 of sections 60, 62 have first been lowered to the ground or in close proximity thereto. In this respect, each ofthe outer wheels 104 of the sections 60, 62 is provided with a protrusion 138 as shown best in FIG. 8 which is disposed when the wheel 104 is fully retracted to slip up into a catch 140 located on the center beam 12 of carrier frame 10 behind ledge 126. Thus, any attempted outward swinging of the sections 60, 62 with the protrusions 138 received in their catches 140 is prevented, until such time as the wheels 104 are lowered sufficiently to withdraw the protrusions 138.

OPERATION

During field operations the machine is disposed as illustrated in FIG. 1 wherein the outrigger sections 60, 62 are retained in their working positions by the tension links 108, 110. At such time, the ground wheels 104 of outrigger sections 60 and 62 are inground contact, as are the wheels 26 of center section 22, and the degree of soil penetration and contact of openers 142 and press wheels 144 on the drill units 24, 80, and 82 is determined by the extent of relative retraction of the ground wheels 26, 104. In this regard, it will be appreciated that as the ground wheels 26 for center section 22 are extended with respect to the latter, the center drill unit 24 rises correspondingly relative to the cross beam 20 as the three-point linkage 30 swings upwardly. Likewise, although in a slightly different manner, as the wheels 104 associated with outer sections 60, 62 are extended, the outer units 80, 82 rise, although not relative to their beams 76, 78. Instead, upward movement of the units 80, 82 carries the tool beams 76, 78 along with the units 80, 82 as a result of the non-pivoting connection between the upper links 92 and the respective beams 76, 78. Beams 76, 78 merely flex upwardly about their pivot assemblies 64, 66 at such time. Thus, although accomplished in slightly different ways, the net effect between all of the sections 22, 60, and 62 is precisely the same insofar as depth control is concerned.

FIGS. 9, 10, and 11 are helpful in illustrating the superb flexibility which is achieved by the machine notwithstanding its substantial width. For example, and bearing in mind that the carrier frame 10 always remains at the same height since its ground wheels 16 are non-retracting, FIG. 9 shows the condition of things when all three of the drill sections 22, 60, and 62 are fully elevated. Since the center unit 24 is mounted for swinging movement relative to its cross beam 20, the latter simply stays down with the remainder of the carrier frame 10 as the center unit 24 rises in the FIG. 9 condition. However, with respect to the outer drill units 80, 82, since the upper links 92 are non-swinging, the outer ends of the beams 76, 78 rise upwardly with the units 80, 82 at such time. It will be appreciated that although the beams 76, 78 become canted with respect to the units 80, 82, this poses no problem whatsoever in view of the various swivel connections associated with the lower links 88, 90 and the rear end of the upper link 92.

At the other extreme as illustrated in FIG. 10, the units 24, 80, and 82 are fully lowered, during which lowering movement the center unit 24 has swung down relative to the cross beam 20 through three-point linkage 30 while cross beam 20 has remained in the same position at all times. On the other hand, as the outer units 80, 82 have also moved downwardly, the outer ends of the beams 76, 78 have been carried therewith into a position essentially level with the cross beam 20 as illustrated. Once again, the swiveling nature of the connections between the outer units 80, 82 and the beams 76, 78 has facilitated such motion.

FIG. 11 illustrates the type of independent, radial flotation which is exhibited by the sections of the machine during field operation. In this respect, the machine behaves as if there were three totally separate drills involved since each of the units 24, 80, and 82 can rise and fall totally independently of the others and cock and cant as may be necessary or desirable according to the terrain encountered. Due to the absence of restrictive fore-and-aft hinge pivots between the drill units as is common in many constructions, the flexing action involved is not in the nature of wings which flap up and down about a central body, but rather is like having three separate, individual units which are totally disconnected from one another except for their incidental common reliance upon a central source of towing power. The radial flotation in which each of the units can effectively rotate about fore-and-aft axes passing through the swives associated with upper links 54 and 92, located inboard of the two opposite ends of each unit, is especially beneficial in this respect. Manifestly, because of the free-floating nature of the beams 76, 78, the latter merely rise and fall as need be to accommodate the various individual motions of the outer units 80, 82, while the various swivel connections associated with such units permit a variety of angular relationships between the beams 76, 78 and the units 80, 82 without any adverse effect whatsoever.

It should also be pointed out that, preferably, the lift cylinders for the wheels 26 of center section 22 are on a separate hydraulic circuit from the lift cylinders for the wheels 104 of outer sections 60, 62. Consequently, if desired, the center unit 24 can be raised or lowered independently of and without in any way affecting the height of the outer drill units 80, 82 while, conversely, the two outer units 80, 82 can be raised or lowered without affecting the height of the center unit 24. This is further made possible, of course, by virtue of the fact that the beams 76, 78 of the outer sections 60, 62 are not connected with the cross beam 20 for center section 22 except through the pivot assemblies 64, 66, which permit the beam 76, 78 to rise and fall totally independently of the cross beam 20.

Notwithstanding this superb flexibility of the machine, the outer sections 60, 62 may be folded into a neat, compacted condition for over-the-road transport of the machine as illustrated in FIGS. 6, 7, and 8. Before commencing such folding, all three of the drill units 24, 80, and 82 are elevated to lift their openers 142 and press wheels 144 out of the ground. Thereupon, the swing cylinders 124 are retracted, and outer sections 60, 62 begin to swing forwardly, rolling on their ground wheels 104. As the sections 60, 62 approach the folded condition as illustrated in FIG. 6, the support bars 130 and 132 of each section enter the vicinity of the ledges 126 and 128 and are progressively guided up into position resting thereon by the guide ramps 128 and the anti-friction rollers 134. Once the sections 60, 62 are fully folded, complete retraction of the lift cylinders 106 associated with the wheels 104 of the outer sections 60, 62, causes the safety interlocks 136 to be engaged as protrusions 138 thereof become received up into the catches 140. As earlier described, until the protrusions 138 are lowered out of the catches 140 by lowering the wheels 104 to the ground, the outrigger sections 60, 62 may not be swung outwardly off the carrier frame 10.

It will be appreciated that when the outrigger sections 60, 62 are fully folded forwardly, the weight thereof is borne totally by the carrier frame 10 and the ground wheels 104 have no effect. However, the weight of the center section 22 remains carried by the ground wheels 26 thereof, and this has a very beneficial effect in reducing the load on carrier frame 10. Moreover, the tandem wheel effect provided by the wheels 26 of center section 22 trailing behind the wheels 16 of carrier frame 10 provides additional stability for the machine during roading operations.

Also of significance is the cocked nature of the hinge assemblies 64 and 66 coupling the beams 76, 78 with the carrier frame 10. In this respect, due to the fact that the upright pivot members 68 of such assemblies are cocked upwardly and inwardly, the net result is for the beams 76, 78 to rotate slightly about their longitudinal axes as they swing between the transport and field working positions thereof. With the beams 76, 78 disposed to have their upper and lower surfaces essentially parallel to the ground when those beams are in the working psoition, this results in the beams being "twisted" inwardly to a slight extent when in their transport positions. As illustrated in FIG. 8, therefore, the openers 142 and the press wheels 144, which are disposed below and substantially outboard of the beams 76, 78, are elevated above the positions which they would otherwise assume and an extra amount of ground clearance is provided beneath the same to facilitate and promote safe roading operations.

We claim:
1. In a folding agricultural implement, the improvement comprising:
 at least a pair of elongated tool units each provided with retractable ground wheels supporting the units for ground travel in field-working positions wherein the units are disposed at least generally end-to-end with their longitudinal axes extending transversely of the path of travel of the implement;
 a carrier frame adapted for ground travel;
 means coupling said units with said frame for towing thereby in said field-working position, said coupling means including structure adapting said units for independent swiveling movement about first respective fore-and-aft axes located between the opposite ends of the respective units, said units being selectively positionable in transport positions wherein said longitudinal axes thereof extend generally fore-and-aft to render the implement folded into a laterally compacted condition; and apparatus supporting said units on said carrier for transport thereby when the units are in said transport positions with said ground wheels retracted, said coupling means further including components permitting the units and their respective first axes to swing independently up and down about second respective fore-and-aft axes spaced inwardly from and located between said first axes as the ground wheels of the units encounter terrain irregularities, said component for each unit including a beam pivotally connected to one end to the frame for up-and-down and fore-and-aft swinging movement with its corresponding unit between said working and transport positions and releasably retainable in either of said positions, said structure including swivel connector means between each beam and its corresponding unit, said swivel connector means for each unit including a pair of generally horizontally spaced lower links having swivel connections at their opposite ends with the beam and the unit, and an upper link spaced above and between said lower links having a rigid connection with its beam and a swivel connection with its unit.

2. In a folding agricultural implement as claimed in claim 1, wherein said frame is provided with a third, elongated transversely extending tool unit disposed between and in at least generally end-to-end alignment with said pair of units when the latter are in said working positions, said third unit being attached to said frame for up-and-down movement relative thereto independently of the other units and being provided with ground wheel means supporting said third unit for both field-working and over-the-road travel.

3. In a folding agricultural implement as claimed in claim 2, wherein said ground wheel means is retractable relative to said third unit for raising and lowering the latter.

4. In a folding agricultural implement as claimed in claim 2, wherein said third unit is provided with swivel means attaching the same to the frame in a manner to adapt the third unit for free-swiveling movement about a fore-and-aft axis located between its opposite ends.

5. A pull-type folding agricultural implement comprising:

a carrier frame provided with means supporting the same for ground travel;

a pair of beams projecting from opposite sides of said frame and provided with means pivotally coupling the same to the frame for fore-and-aft swinging movement between laterally outwardly extending field-working positions and folded-in, fore-and-aft extending transport positions, said pivotal coupling means also providing free-floating, up-and-down swinging movement of the beams relative to one another and to the frame;

means for releasably retaining the beams in said working position;

an elongated tool unit for each of said beams respectively provided with retractable ground wheel means supporting the unit for ground travel;

means coupling each of said units to its respective beam in such a manner that the longitudinal axes of the units extend at least generally parallel to the beams and the units are disposed in at least generally end-to-end alignment in said working position, said coupling means for each unit including structure permitting the unit to swivel freely relative to its beam about a fore-and-aft axis located between the opposite ends of the unit when the units are in said working position; and apparatus for supporting the beams and the units on the frame for transport thereby when the beams and units are folded into said transport position and the ground wheel means of the units are retracted off the ground, said swivel structure for each unit including a pair of lower, longitudinally spaced links having swivel connections at one end with the unit and swivel connections at the opposite end with the beam, and a third, upper link between and above the lower links having a swivel connection at one end with the unit and a rigid connection at the opposite end with the beam.

6. An implement as claimed in claim 5, wherein the beams are adapted to fold forwardly when moving from said working positions to said transport position.

7. An implement as claimed in claim 5, and power means for effecting said swinging of the beams between said working and transport positions.

8. An implement as claimed in claim 5, wherein said frame is provided with a third, elongated transversely extending tool unit disposed between and in at least generally end-to-end alignment with said pair of units when the latter are in said working positions, said third unit being attached to said frame for free-floating up-and-down movement relative thereto independently of the other units and being provided with ground wheel means supporting said third unit for both field-working and over-the-road travel.

9. An implement as claimed in claim 8, wherein said third unit is further provided with swivel means attaching the same to the frame in a manner to adapt the third unit for free swiveling movement about a fore-and-aft axis located between its opposite ends.

10. A pull-type folding agricultural implement comprising:

a carrier frame provided with means supporting the same for ground level;

a pair of beams projecting from opposite sides of said frame and provided with means pivotally coupling the same to the frame for fore-and-aft swinging movement between laterally outwardly extending field-working positions and folded-in, fore-and-aft extending transport positions, said pivotal coupling means also providing free-floating, up-and-down swinging movement of the beam relative to one another and to the frame;

means for releasably retaining the beams in said working position;

an elongated tool unit for each of said beams respectively provided with retractable ground wheel means supporting the unit for ground travel;

means coupling each of said units to its respective beam in such a manner that the longitudinal axes of the units extend at least generally parallel to the beams and the units are disposed in at least generally end-to-end alignment in said working position, said coupling means for each unit including structure permitting the unit to swivel freely relative to its beam about a fore-and-aft axis located between the opposite ends of the unit when the units are in said working position; and apparatus for supporting the beams and the units on the frame for transport thereby when the beams and units are folded into said transport position and the ground wheel means of the units are retracted off the ground, said pivotal coupling means for the beams being cocked slightly in such a manner that the beams rotate slightly about their longitudinal axes as they move from said working position to said transport position, whereby to increase the ground clearance in the transport position for portions of said units disposed below and outboard of the beams.

11. A pull-type folding agricultural implement comprising:

a carrier frame provided with means supporting the same for ground travel;

a pair of beams projecting from opposite sides of said frame and provided with means pivotally coupling the same to the frame for fore-and-aft swinging movement between laterally outwardly extending field-working positions and folded-in, fore-and-aft extending transport positions, said pivotal coupling means also providing free-floating, up-and-down swinging movement of the beams relative to one another and to the frame;

means for releasably retaining the beams in said working position;

an elongated tool unit for each of said beams respectively provided with retractable ground wheel means supporting the unit for ground travel;

means coupling each of said units to its respective beam in such a manner that the longitudinal axes of the units extend at least generally parallel to the beams and the units are disposed in at least generally end-to-end alignment in said working position, said coupling means for each unit including structure permitting the unit to swivel freely relative to its beam about a fore-and-aft axis located between the opposite ends of the unit when the units are in said working position; and apparatus for supporting the beams and the units on the frame for transport thereby when the beams and units are folded into said transport position and the ground wheel means of the units are retracted off the ground, said frame being provided with a pair of ledges located one each on opposite sides of the frame, said units having projections receivable on a corresponding pair of ledges when the units are in the transport position.

12. An implement as claimed in claim 11, wherein each of said ledges is provided with an entry guide ramp, each of said projections having an anti-friction roller at the outer end thereof for rolling engagement with the corresponding ramp as the projection approaches the ledge.

13. A pull-type folding agricultural implement comprising:

a carrier frame provided with means supporting the same for ground travel;

a pair of beams projecting from opposite sides of said frame and provided with means pivotally coupling the same to the frame for fore-and-aft swinging movement between laterally outwardly extending field-working positions and folded-in, fore-and-aft extending transport positions, said pivotal coupling means also providing free-floating, up-and-down swinging movement of the beams relative to one another and to the frame;

means for releasably retaining the beams in said working position;

an elongated tool unit for each of said beam respectively provided with retractable ground wheel means supporting the unit for ground travel;

means coupling each of said units to its respective beam in such a manner that the longitudinal axes of the units extend at least generally parallel to the beams and the units are disposed in at least generally end-to-end alignment in said working position, said coupling means for each unit including structure permitting the unit to swivel freely relative to its beam about a fore-and-aft axis located between the opposite ends of the unit when the units are in said working position; and apparatus for supporting the beams and the units on the frame for transport thereby when the beams and units are folded into said transport position and the ground wheel means of the units are retracted off the ground, said frame and said wheel means of the units being provided with a safety interlock therebetween for assuring that the wheel means are lowered to the ground before the units are removed from their transport positions on the carrier frame, said interlock for each unit including a protrusion associated with the wheel means of each unit respectively and a catch on the frame for each of said protrusions, said protrusions being movable with their respective wheel means during retraction of the latter into positions received by said catches when the units are in the transport position.

14. In a folding agricultural implement, the improvement comprising:

a mobile fore-and-aft extending carrier frame;

a pair of tool beams on opposite sides of the frame;

a tool unit associated with each of said beams respectively and having a portion thereof projecting below the beam and laterally outwardly therefrom to an outboard extremity;

a pivot assembly joining the inner ends of each of the beams respectively with said frame in a manner to adapt the beams for movement between a laterally outwardly projecting field-working position and an inwardly folded transport position; and apparatus supporting the beams and units on said frame for transport by the latter in said transport position, said pivot assemblies each including a generally upright pivot member having an upper end cocked inwardly toward the frame out of a vertical disposition in such a direction as to cause the corresponding beam to rotate slightly about its longitudinal axis during swinging thereof from the working to the transport position thereof whereby to raise the lower outboard extremity of the tool unit for extra ground clearance, each of said pivot assemblies further including a second pivot member transverse to the other member adapting the beams for up-and-down swinging movement.

15. In an implement as claimed in claim 14, wherein the beams are adapted to fold forwardly when moving from said working position to said transport position.

16. A pull-type folding agricultural implement comprising:

a carrier frame provided with means supporting the same for ground travel;

a pair of tool sections on opposite sides of said frame and provided with means pivotally coupling the same to the frame for fore-and-aft swinging movement between laterally outwardly extending field-working positions and folded-in, fore-and-aft extending transport positions, said pivotal coupling means also providing for up-and-down swinging movement of the sections relative to the frame;

means for releasably retaining the sections in said working position, each of said sections including retractable ground wheel means supporting the sections for ground travel in said working position;

apparatus supporting the sections on the frame for transport thereby when the sections are folded into said transport position and the ground wheel means thereof are retracted off the ground; and a safety interlock between the wheel means and the frame for assuring that the wheel means are lowered to the ground before the sections are removed from their transport positions on the carrier frame, said interlock for each section including a protrusion associated with the wheel means of the section and a catch on the frame for each of said protrusions, said protrusions being movable with their respective wheel means into positions received by said catches during retraction of the wheel means when the sections are in the transport position.

17. In an implement as claimed in claim 16, wherein the sections are adapted to fold forwardly when moving from said working position to said transport position.

18. In a pull-type folding agricultural implement, the improvement comprising:

a carrier frame provided with ground wheels supporting the same for ground travel;

a pair of outrigger tool sections on opposite sides of said frame and provided with means pivotally coupling the same to the frame for fore-and-aft swinging movement between laterally outwardly extending field-working positions and folded-in, fore-and-aft extending transport positions, each of said sections including retractable ground wheel means supporting the sections for ground travel in said working position;

apparatus supporting the sections on the frame for transport thereby when the sections are folded into said transport position and the ground wheel means thereof are retracted off the ground; and a third, trailering center tool section coupled with said carrier frame at the rear end of the latter between said outrigger sections and provided with ground wheels, separate from the ground wheels of the carrier frame, supporting the center section during both field working when the outrigger sections are in said working position and over-the-road travel when the outrigger sections are in said transport position.

* * * * *